US011181141B2

(12) United States Patent
Lee et al.

(10) Patent No.: US 11,181,141 B2
(45) Date of Patent: Nov. 23, 2021

(54) AIR FOIL BEARING

(71) Applicant: HANWHA POWER SYSTEMS CO., LTD, Changwon-si (KR)

(72) Inventors: Tae Wook Lee, Changwon-si (KR); Kang Soo Im, Changwon-si (KR); Jin Tae Kim, Changwon-si (KR); Jong Won Choi, Changwon-si (KR)

(73) Assignee: HANWHA POWER SYSTEMS CO., LTD, Changwon-si (KR)

( * ) Notice: Subject to any disclaimer, the term of this patent is extended or adjusted under 35 U.S.C. 154(b) by 0 days.

(21) Appl. No.: 16/902,514

(22) Filed: Jun. 16, 2020

(65) Prior Publication Data

US 2020/0392985 A1    Dec. 17, 2020

(30) Foreign Application Priority Data

Jun. 17, 2019   (KR) .......................... 10-2019-0071704

(51) Int. Cl.
*F16C 17/02* (2006.01)

(52) U.S. Cl.
CPC .................................. *F16C 17/024* (2013.01)

(58) Field of Classification Search
CPC ............................. F16C 17/024; F16C 17/042
See application file for complete search history.

(56) References Cited

U.S. PATENT DOCUMENTS

| 4,262,975 | A  | * | 4/1981  | Heshmat    | F16C 17/024 384/119 |
| 5,228,785 | A  | * | 7/1993  | Saville    | F16C 17/024 384/103 |
| 6,450,688 | B2 | * | 9/2002  | Matsushima | F16C 17/024 384/103 |
| 2001/0028752 | A1 | * | 10/2001 | Matsushima | F16C 43/02 384/103 |
| 2004/0042691 | A1 | * | 3/2004  | Matsunaga  | F16C 17/042 384/103 |
| 2007/0183697 | A1 | * | 8/2007  | Lee        | F16C 27/02 384/106 |
| 2014/0140645 | A1 | * | 5/2014  | Meacham    | F16C 27/02 384/129 |
| 2019/0154080 | A1 | * | 5/2019  | Lee        | F16C 17/024 |

FOREIGN PATENT DOCUMENTS

| KR | 10-2002-0062077 A | 7/2002 |
| KR | 10-2018-0018178 B1 | 2/2018 |
| KR | 10-1895143 B1 | 9/2018 |

* cited by examiner

*Primary Examiner* — Alan B Waits
(74) *Attorney, Agent, or Firm* — Sughrue Mion, PLLC

(57) ABSTRACT

An air foil bearing includes a bearing housing having a cylindrical shape that forms an accommodation space in a middle thereof for a rotating shaft, rotor, or journal; a first foil including a plurality of bump foils, which are arranged along an inner wall surface of the accommodation space of the bearing housing; and a second foil including a plurality of top foils, which are arranged in a circumferential direction along an inner circumference of the bearing housing to correspond to the plurality of bump foils and to support the rotating shaft, rotor, or journal. A portion of at least one of the plurality of top foils of the second foil is thicker than the other top foils of the plurality of top foils.

15 Claims, 14 Drawing Sheets

AIR FOIL BEARING

CROSS-REFERENCE TO THE RELATED APPLICATION

This application is based on and claims priority under 35 U.S.C. § 119 to Korean Patent Application No. 10-2019-0071704, filed on Jun. 17, 2019, in the Korean Intellectual Property Office, the disclosure of which is incorporated by reference herein in its entirety.

BACKGROUND

1. Field

Embodiments of the present disclosure relate to an air foil bearing, and more particularly, to an air foil bearing installed in a high-speed rotating device such as, for example, a compressor or a turbo motor to improve the load bearing capacity of a rotating member, to minimize an increase in temperature, and to stabilize vibration.

2. Description of Related Art

A bearing is a mechanical element that fixes a rotating shaft at a certain position and rotatably supports the shaft while supporting a self-load of the shaft and a load applied to the shaft. A ball bearing or a journal bearing is a bearing that supports a shaft using an oil film, and an air foil bearing is a bearing that supports a shaft by forming a high-pressure air layer between a top foil and the shaft.

Since an air foil bearing can effectively support a rotating body such as a rotating body rotating at high speed, it is applicable to a rotating body such as a turbo compressor or a turbo blower. An air foil bearing may be used as a bearing for a rotating body such as a small-size, lightweight rotor rotating at a high speed of, for example, 50,000 rpm to 150,000 rpm.

A typical air foil bearing may include a bearing housing, a rotating member (e.g., a rotating shaft, a rotor, or a journal), a top foil, and a bump foil. The bearing housing may have a cylindrical shape to form an accommodation space in which to receive the rotating member. The top foil and the bump foil may be mounted in the bearing housing. The bump foil may be disposed along the inner wall surface of the bearing housing and may be provided in an embossed shape or a wavy shape. The top foil may be placed between the rotating member and the bump foil. One end of the top foil may be coupled to the bearing housing, and the other end of the top foil may extend in the circumferential direction of the bearing housing to be able to be elastically driven.

As the rotating member slowly rotates inside the bearing housing, a high-pressure air layer may be formed between the rotating member and the top foil, which is in contact with the rotating member. The pressure of the air layer formed between the rotating member and the top foil rapidly increases due to the rotational force of the rotating member, and as a result, a large load is applied in the radial direction of the rotating member. The load in the radial direction of the rotating member may be supported primarily by the top foil. As the load in the radial direction of the rotating member is applied to the top foil, the top foil may move in the circumferential direction of the bearing housing, and sliding friction may be generated between the top foil and the bump foil. Due to the sliding friction, the load applied in the radial direction of the rotating member may be damped.

However, since the load bearing capacity of the rotating member of the typical air foil bearing is determined by the total pressure of air formed in the typical air foil bearing, there is the need to increase the total pressure of the air. However, the typical air foil bearing has no structure for increasing the pressure of air and is thus difficult to improve load bearing capacity. Thus, an unstable behavior may occur during the rotation of the rotating member.

Also, if the rotational speed of the journal increases beyond a critical speed, severe vibration and impact may be generated in the typical air foil bearing so that the typical air foil bearing may not be able to properly support the rotation of the rotating member.

SUMMARY

Embodiments of the present disclosure provide an air foil bearing capable of stably supporting the load applied upon the rotation of a rotating member and properly absorbing vibration or impact.

Embodiments of the present disclosure provide an air foil bearing capable of minimizing an increase in the amount of heat generated therein by friction caused by the rotation of a rotating member.

However, embodiments of the present disclosure are not restricted to those set forth herein. The above and other embodiments of the present disclosure will become more apparent to one of ordinary skill in the art to which the present disclosure pertains by referencing the detailed description of the present disclosure given below.

According to embodiments of the present disclosure, an air foil bearing is provided. The air foil bearing includes: a bearing housing having a cylindrical shape that forms an accommodation space in a middle thereof for a rotating shaft, rotor, or journal; a first foil including a plurality of bump foils, which are arranged along an inner wall surface of the accommodation space of the bearing housing; and a second foil including a plurality of top foils, which are arranged in a circumferential direction along an inner circumference of the bearing housing to correspond to the plurality of bump foils and to support the rotating shaft, rotor, or journal, wherein a portion of at least one of the plurality of top foils of the second foil is thicker than the other top foils of the plurality of top foils.

According to an embodiment of the present disclosure, the plurality of top foils are configured as leaf springs and each top foil of the plurality of top foils include: a coupling body, which is coupled to a respective key slot that is provided on the inner circumference of the bearing housing, a first region, which is placed on a top surface of at least one of the plurality of bump foils, connected to the coupling body of the top foil, and a second region, which is elastically bent from an end of the first region of the top foil and is exposed to be in contact with the rotating shaft, rotor, or journal, the second region of the top foil overlapped by the first region of a respective neighboring top foil of the plurality of top foils.

According to an embodiment of the present disclosure, the plurality of top foils include at least three top foils and the plurality of bump foils include at least three bump foils, and at least two top foils of the plurality of top foils that are adjacent to each other in a rotational direction of the rotating shaft, rotor, or journal, each of the at least two top foils including the portion that is thicker than the other top foils of the plurality of top foils.

According to an embodiment of the present disclosure, for each of the at least two top foils, a thickness of the first region and the second region thereof is greater than a thickness of the coupling body thereof.

According to an embodiment of the present disclosure, each of the at least two top foils have a same thickness from the coupling body to the second region thereof.

According to an embodiment of the present disclosure, for each of the at least two top foils, a thickness of the top foil gradually increases from the coupling body thereof to an end of the second region thereof, furthest away from the coupling body.

According to an embodiment of the present disclosure, for each of the at least two top foils, a thickness of the second region thereof is greater than a thickness of the first region and the coupling body thereof.

According to an embodiment of the present disclosure, for each of the at least two top foils, a thickness of the top foil gradually increases from an end of the second region thereof to an opposite end of the second region thereof.

According to an embodiment of the present disclosure, for each of the at least two top foils, a thickness of the coupling body, the first region, and the second region thereof is the same.

According to an embodiment of the present disclosure, the thickness of the first region and the second region of each of the at least two top foils is greater than a thickness of each of the coupling body, the first region, and the second region of the other top foils.

According to an embodiment of the present disclosure, the coupling body, the first region, and the second region of each of the at least two top foils is thicker than each of the coupling body, the first region, and the second region of the other top foils.

According to an embodiment of the present disclosure, the end of the second region of each of the at least two top foils is thicker than each of the coupling body, the first region, and the second region of the other top foils.

According to an embodiment of the present disclosure, the thickness of the second region of each of the at least two top foils is greater than a thickness of each of the coupling body, the first region, and the second region of the other top foils.

According to an embodiment of the present disclosure, for each of the at least two top foils, a thickness of the coupling body and the first region thereof is the same.

According to an embodiment of the present disclosure, at least one bump foil of the plurality of bump foils, corresponding to the at least one of the plurality of top foils of the second foil that is thicker than the other top foils, is thicker than other bump foils of the plurality of bump foils.

According to an embodiment of the present disclosure, the plurality of bump foils include a plurality of overlapping foils.

According to an embodiment of the present disclosure, an entirety of the other top foils of the plurality of top foils has a constant thickness.

According to embodiments of the present disclosure, air foil bearing is provided. The air foil bearing includes: a bearing housing having a cylindrical shape that forms an accommodation space in a middle thereof for a rotating shaft, rotor, or journal; a first foil including a plurality of bump foils, which are arranged along an inner wall surface of the accommodation space of the bearing housing; and a second foil including a plurality of top foils, which are arranged in a circumferential direction along an inner circumference of the bearing housing to correspond to the plurality of bump foils and to support the rotating shaft, rotor, or journal, wherein at least one bump foil of the plurality of bump foils, corresponding to at least one of the plurality of top foils, is thicker than other bump foils of the plurality of bump foils.

According to an embodiment of the present disclosure, the at least one bump foil is formed of a plurality of overlapping foils.

According to embodiments of the present disclosure, a second foil is provided. The second foil being for an air foil bearing that includes a bearing housing having a cylindrical shape that forms an accommodation space in a middle thereof for a rotating shaft, rotor, or journal, and that further includes a first foil including a plurality of bump foils, which are arranged along an inner wall surface of the accommodation space of the bearing housing. The second foil includes: a plurality of top foils, which are configured to be arranged in a circumferential direction along an inner circumference of the bearing housing to correspond to the plurality of bump foils and to support the rotating shaft, rotor, or journal, wherein a portion of at least one of the plurality of top foils of the second foil is thicker than the other top foils of the plurality of top foils.

According to one or more of the aforementioned and other embodiments of the present disclosure, since at least one of a plurality of top foils that support a rotating member rotating at high speed is formed to be relatively thick, the load bearing force of the rotating member during rotation can be improved, and vibration of, and impact from, the rotating member can be favorably absorbed.

Since a plurality of top foils that are in contact with the rotating member during rotation of the rotating member are formed to have different thicknesses, the support of the rotating member by a high-temperature air layer that may be formed differently depending on the rotation of the rotating member can be uniformly maintained. Also, since pressure can be uniformly provided by the top foils, an increase in heat generated by friction caused by the rotation of the rotating member inside an air foil bearing can be minimized.

Other features and embodiments may be apparent from the following detailed description, the drawings, and the claims.

BRIEF DESCRIPTION OF THE DRAWINGS

The above and other embodiments and features of the present disclosure will become more apparent by describing in detail embodiments thereof with reference to the attached drawings, in which.

DETAILED DESCRIPTION

Various changes may be made to embodiments the present disclosure, and the present disclosure may have various embodiments which will be described in detail with reference to the drawings. However, the embodiments according to concepts of the present disclosure are not construed as limited to the described embodiments, and include all changes, equivalents, or substitutes that do not depart from the spirit and technical scope of the present disclosure.

The terms used in the present disclosure are for the purpose of describing particular non-limiting example embodiments only and are not intended to be limiting. The singular forms are intended to include the plural forms as well, unless the context clearly indicates otherwise. The term "include" or "has" used in the present disclosure is to indicate the presence of features, numbers, steps, operations, elements, parts, or a combination thereof described in the specifications, and does not preclude the presence or addition of one or more other features, numbers, steps, operations, elements, parts, or a combination thereof.

All of the terms used herein including technical or scientific terms have the same meanings as those generally understood by an ordinary skilled person in the related art unless they are defined otherwise. The terms defined in a generally used dictionary should be interpreted as having meanings that are the same as or similar with the contextual meanings of the relevant technology and should not be interpreted as having ideal or exaggerated meanings unless they are clearly defined in the present disclosure.

Embodiments of the present disclosure will hereinafter be described with reference to the accompanying drawings.

Figure 1:
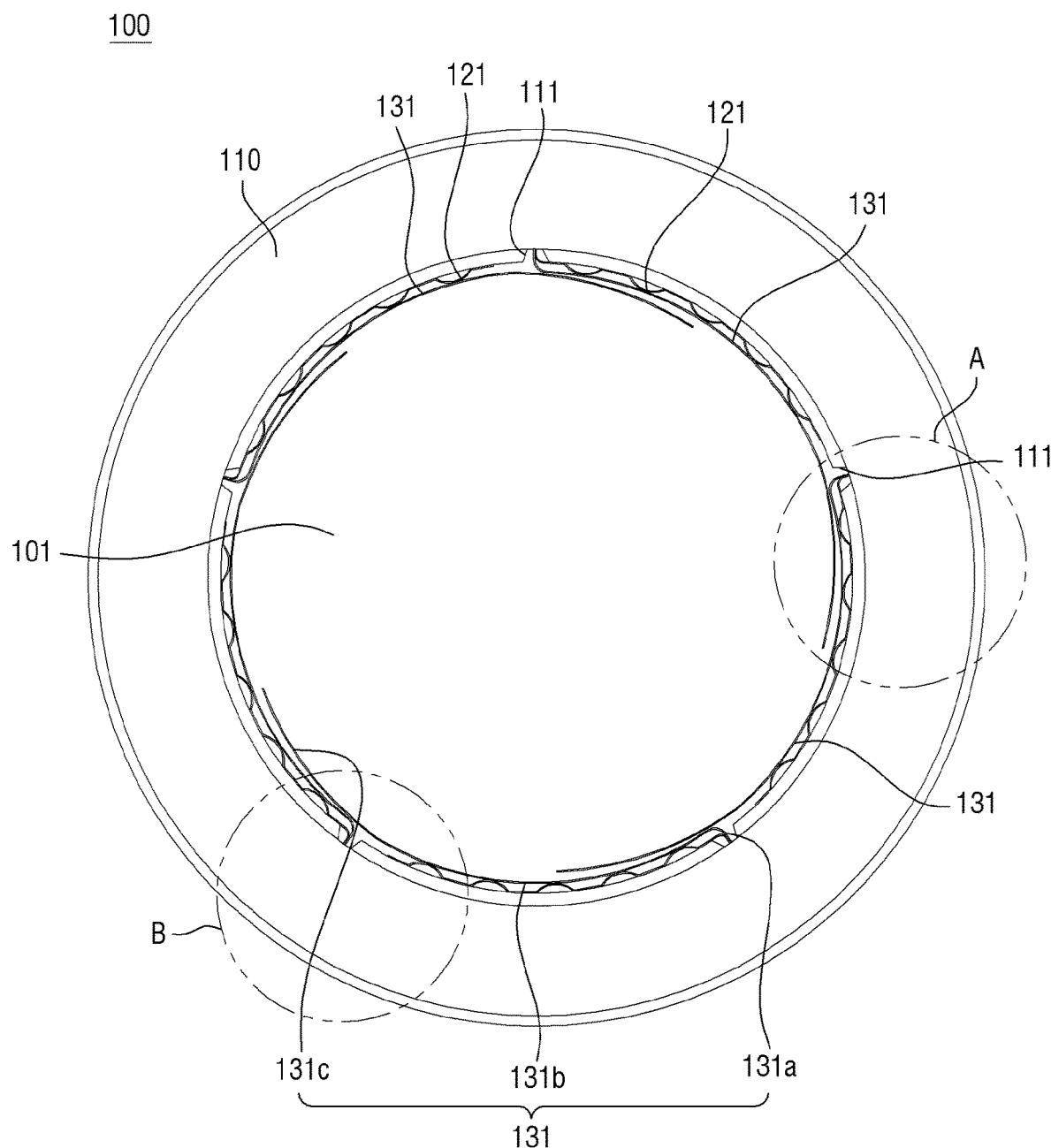
FIG. 1 is a cross-sectional view of an air foil bearing according to an embodiment of the present disclosure.
Figure 2:
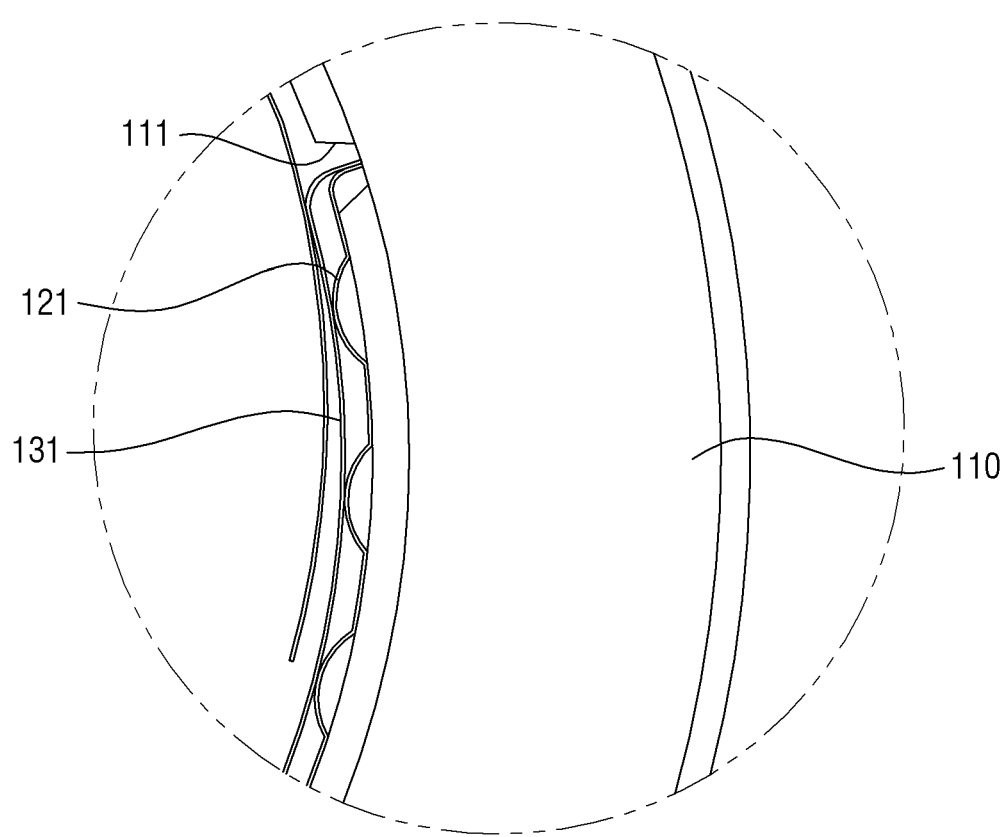
FIG. 2 is a partial enlarged view of the air foil bearing of FIG. 1.

FIG. 1 is a cross-sectional view of an air foil bearing 100 according to an embodiment of the present disclosure. FIG. 2 is a partial enlarged view of the air foil bearing 100.

Referring to FIGS. 1-2, the air foil bearing 100 is an element provided in a mechanical machine equipped with a rotating shaft rotating at high speed. The air foil bearing 100 may include a rotating member (e.g., a rotating shaft, a journal, or a rotor), a bearing housing 110, a first foil 120, and a second foil 130.

The bearing housing 110 may have a cylindrical shape to form a hollow accommodation space. The rotating member may be mounted in the hollow accommodation space to be rotatable. A key slot 111 in which one end of a bump foil 121 of the first foil 120 and one end of a top foil 131 of the second foil 130 are coupled may be formed on the inner circumference of the bearing housing 110. A number of the key slots 111 may be formed to correspond to the numbers of bump foils 121 and top foils 131. For example, as will be described later, four bump foils 121 and four top foils 131 may be formed on the inner circumference of the bearing housing 110, and four key slots 111 may be formed accordingly. Since key slots 111 have a structure that can couple bump foils 121 and top foils 131, the key slots 111 may be formed as recesses, but the shape and the number of key slots 111 are not particularly limited as long as the key slots 111 can fix ends of the bump foils 121 and ends of the top foils 131 into the bearing housing 110.

Figure 3:
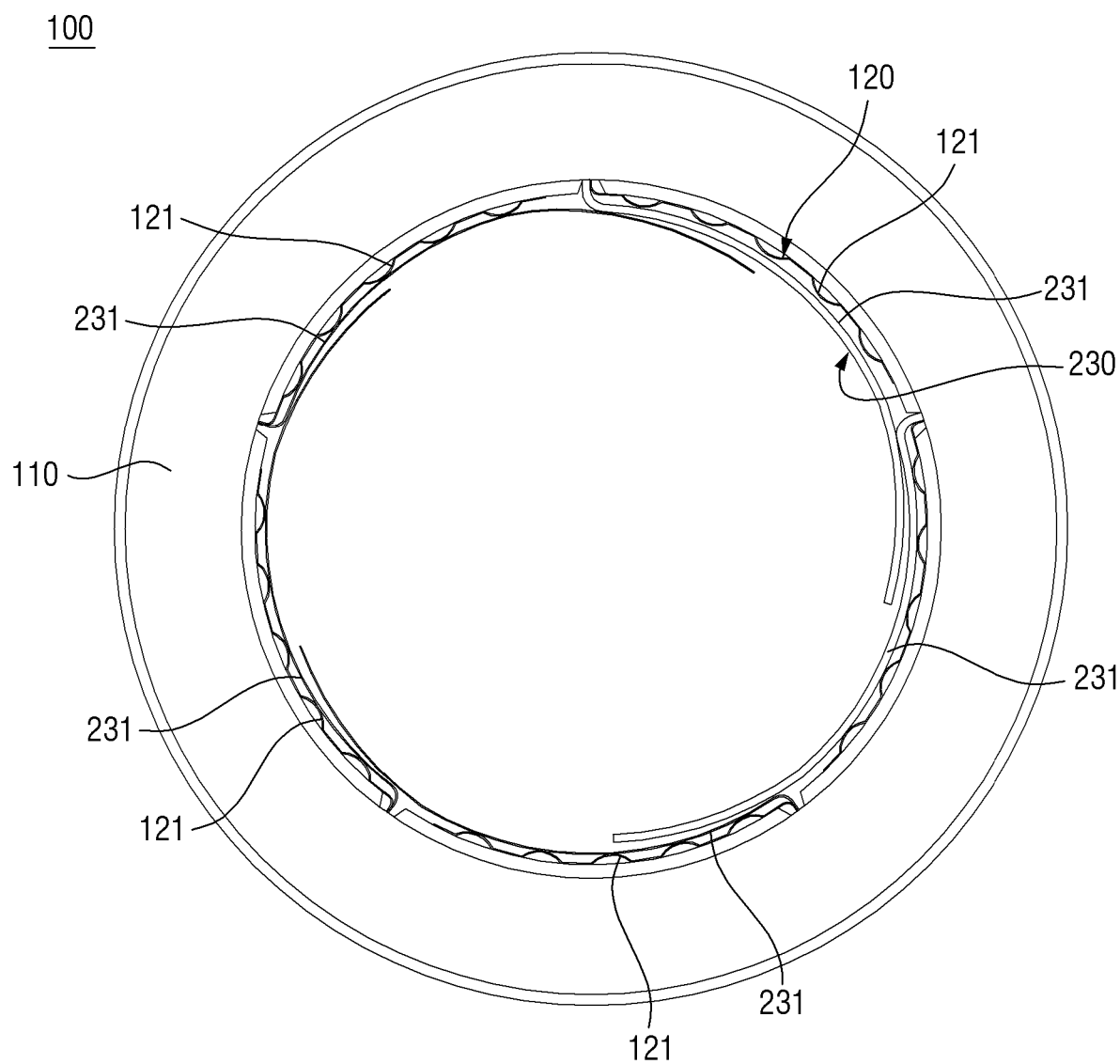
FIG. 3 illustrates an example second foil of the air foil bearing of FIG. 1 in which at least one top foil is relatively thicker than other top foils.
Figure 4A:
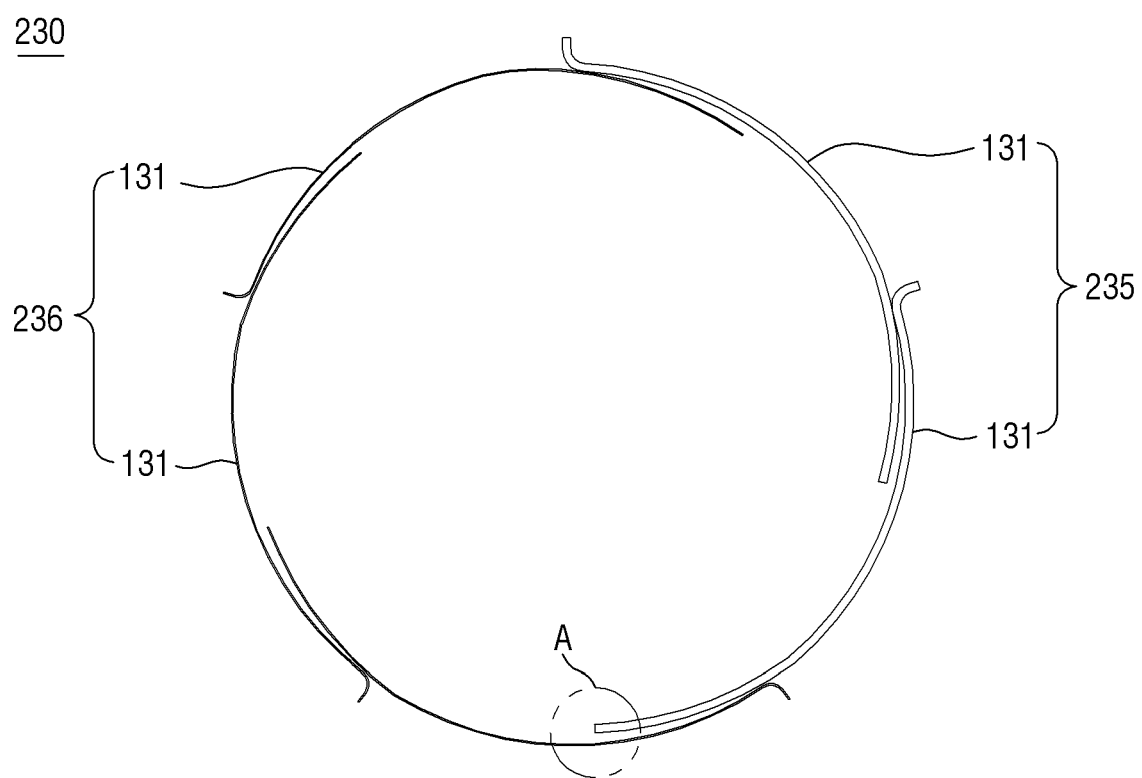
FIG. 4A further illustrates the second foil of FIG. 3.
Figure 4B:
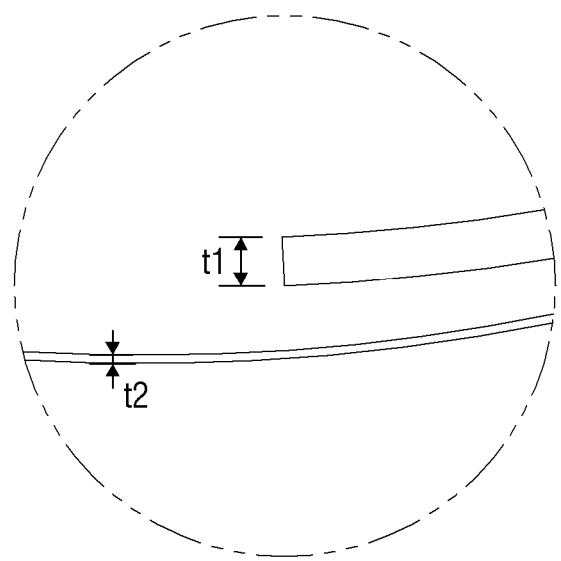
FIG. 4B illustrates a portion of the second foil of FIG. 4A.
Figure 5:
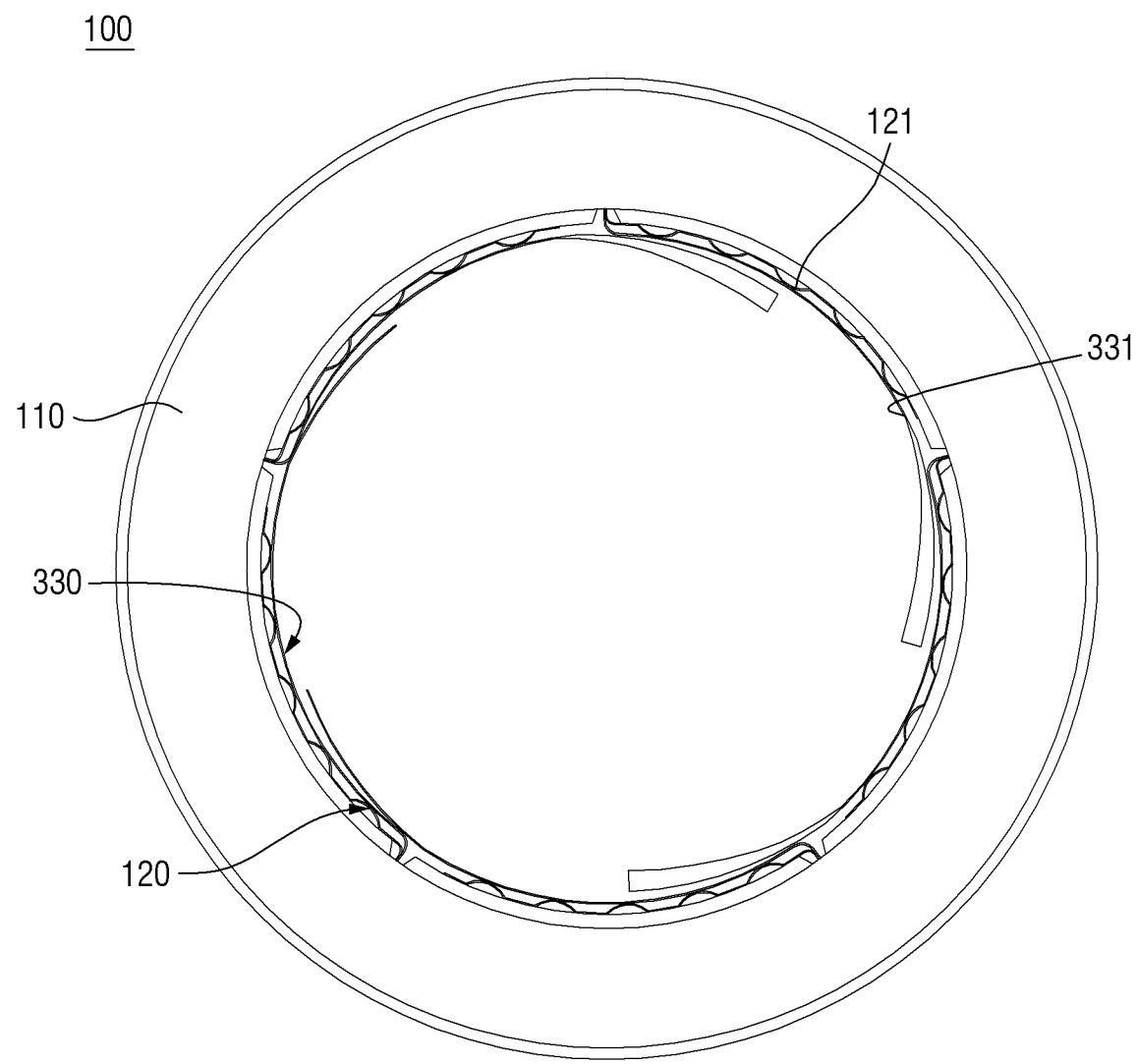
FIG. 5 illustrates another example second foil of the air foil bearing of FIG. 1 in which at least one top foil is relatively thicker than other top foils.
Figure 6:
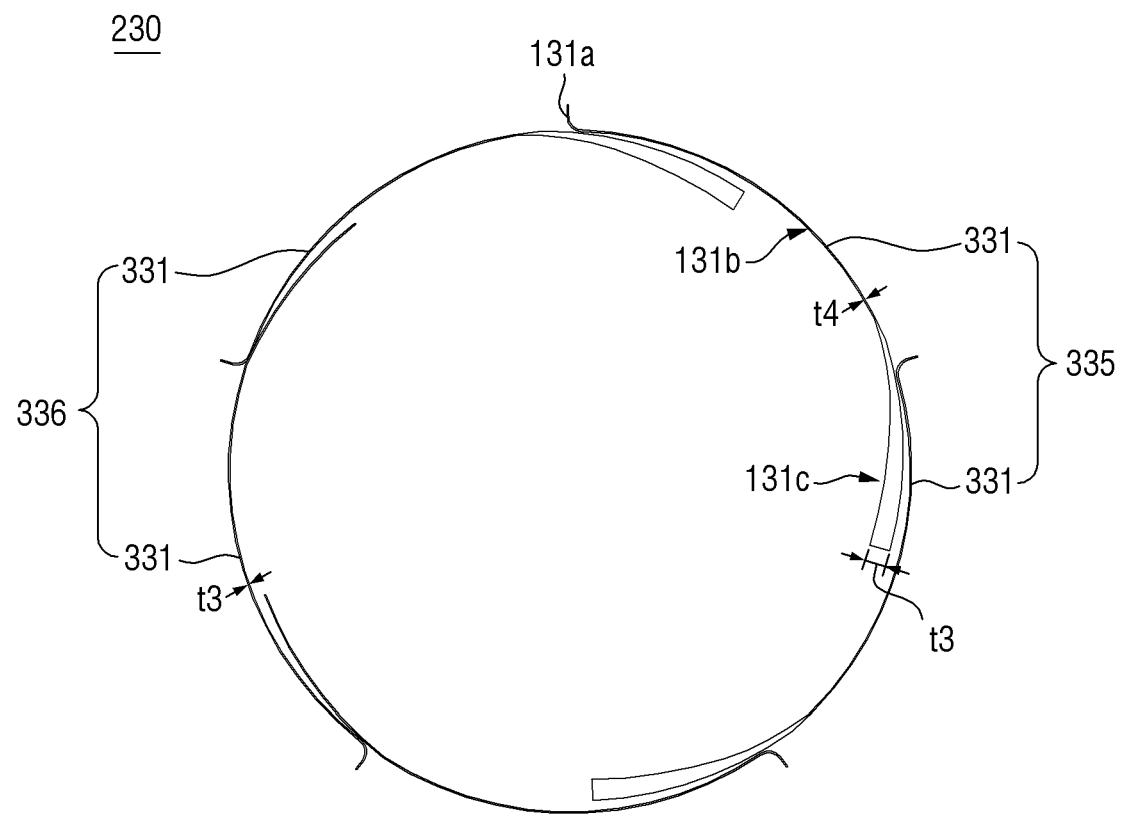
FIG. 6 further illustrates the second foil of FIG. 5.
Figure 7:
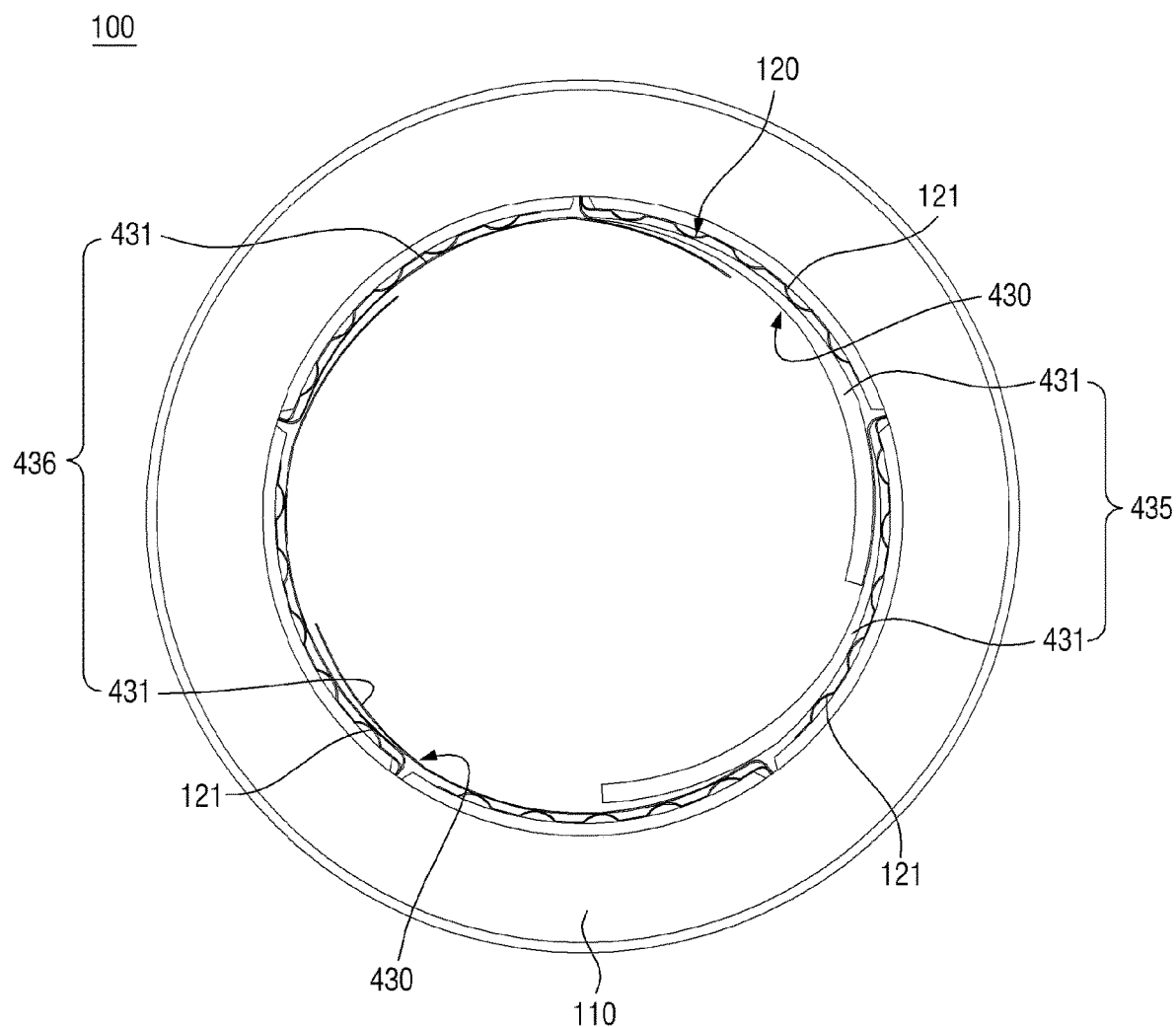
FIG. 7 illustrates another example second foil of the air foil bearing of FIG. 1 in which at least one top foil is relatively thicker than other top foils and has an increasing thickness.
Figure 8A:
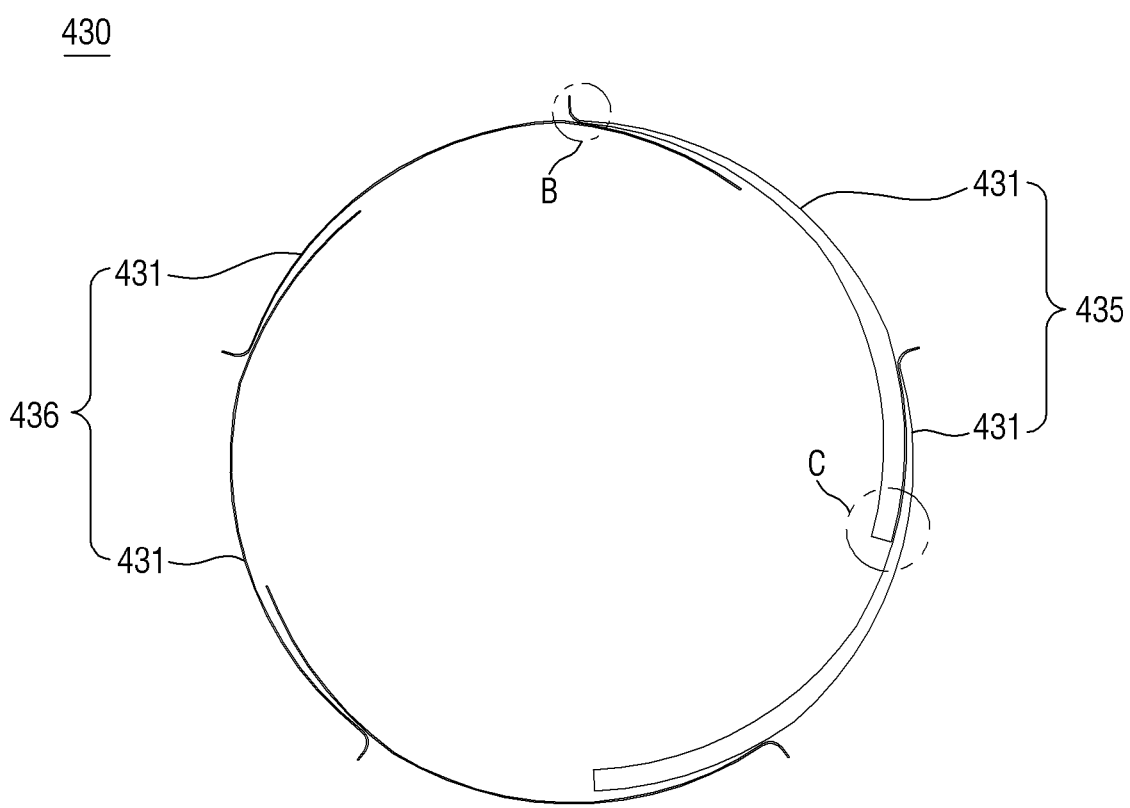
FIG. 8A further illustrates the second foil of FIG. 7.
Figure 8B:
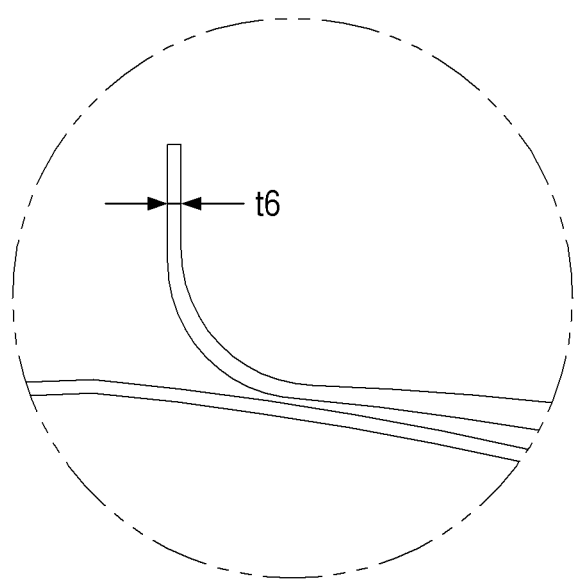
FIG. 8B illustrates a first portion of the second foil of FIG. 8A.
Figure 8C:
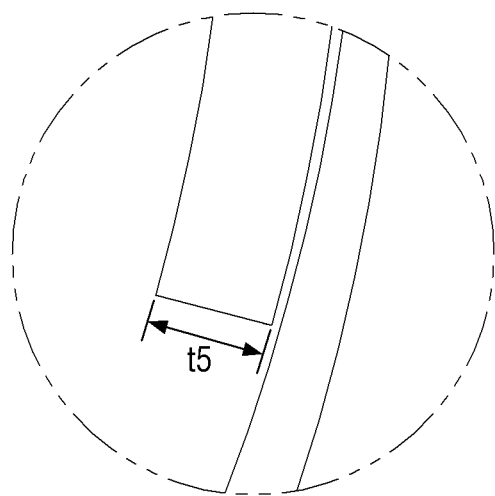
FIG. 8C illustrates a second portion of the second foil of FIG. 8A.

As an alternative to second foil 130, FIG. 3 illustrates a second foil 230 of the air foil bearing 100 in which at least one top foil 231 is relatively thicker than other top foils 231. FIGS. 4A-B further illustrate the second foil 230 of FIG. 3. FIG. 4B illustrates an area A of the second foil part 230 illustrated in FIG. 4A. FIG. 5 illustrates another example second foil 330 of an air foil bearing 100 in which at least one top foil 331 is relatively thicker than other top foils 331. FIG. 6 further illustrates the second foil 330 of FIG. 5. FIG. 7 illustrates another example second foil 430 of the air foil bearing 100 in which at least one top foil 431 is relatively thicker than other top foils 431 and has an increasing thickness. FIGS. 8A-C further illustrates the second foil 430 of FIG. 7. FIGS. 8B-C illustrate an area B and an area C of the second foil 430, respectively, shown in FIG. 8A.

Referring to FIGS. 3 through 8, the first foil parts 130, 230, 330, 430 may include a plurality of bump foils 121. The bump foils 121 may be disposed along the inner wall surface of the accommodation space of the bearing housing 110. For example, four bump foils 121 may be disposed along the inner circumference of the bearing housing 110, but the present disclosure is not limited thereto. The number of bump foils 121 may vary. Two or more bump foils 121 may be provided to be paired with top foils 131, 231, 331, 431 that will be described later. The bump foils 121 may be implemented as a series of semicircles or convex waves. First ends of the bump foils 121 may be coupled to the key slots 111, and series of waves of the bump foils 121 may be disposed along the inner circumference of the bearing housing 110 to reach their respective neighboring key slots 111.

The bump foils 121 may be disposed between the inner circumference of the bearing housing 1110 and the top foils 131, 231, 331, 431. When the rotating member rotates in the hollow space of the bearing the top foils 131, 231, 331, 431 and the bump foils 121 sequentially support the rotating member. Also, the top foils 131, 231, 331, 431 and the bump foils 121 may be provided such that impact generated during the rotation of the rotating member can be appropriately absorbed, and that the load in an axial direction can be stably supported.

As will be described later, at least one of the bump foils 121 may be formed to be thicker than the other bump foils 121 to stably provide elastic support and to properly absorb impact. This will be described later when describing the thickness of the top foils 131, 231, 331, and 431.

The second foil 130, the second foil 230, the second foil 330, and the second foil 430 may include a plurality of top foils 131, 231, 331, 441, respectively, and the top foils 131, 231, 331, 431 may be provided to support the rotating member together with the bump foils 121. The top foils 131, 231, 331, 441 may be paired with the bump foils 121 to be disposed on the inner circumference of the bearing housing 110. Specifically, a plurality of top foils 131, 231, 331, 441 may be arranged in radial directions along the inner circumference of the hollow space of the bearing housing 110 to correspond to the bump foils 121.

As already mentioned above, four bump foils 121 and four top foils 131 (or top foils 231, 331, 431) may be provided, but the present disclosure is not limited thereto. That is, the numbers of bump foils 121 and top foils 131, 231, 331, 431 may vary. Two or more top foils 131, 231, 331, 441 may be provided to be paired with the bump foils 121.

The top foils 131, 231, 331, 431 may be provided in the form of leaf springs. For example, the top foils 131, 231, 331, 441 may form a wide "V" cross-sectional shape. The top foils 131, 231, 331, 431 may be divided into coupling bodies 131a, first regions 131b, and second regions 131c (see FIG. 6 as an example). The coupling bodies 131a may be provided to be coupled to the key slots 111, which are provided along the inner circumference of the bearing housing 110. The first regions 131b, which extend from the coupling portions 131a to be placed on the top surfaces of the bump foils 121, may be disposed to be in contact with the top surfaces of the bump foils 121 and thus to overlap with the bump foils 121, from first ends to second ends of the bump foils 121. The second regions 131c may be elastically bendable at the ends of the first regions 131b and may be provided to be in contact with the rotating member within the hollow space of the bearing housing 110.

The first regions 131b of the top foils 131, 231, 331, 431 may be disposed to overlap with their respective neighboring second regions 131c of the top foils 131, 231, 331, 431 in a direction opposite to a radial direction towards the rotating shaft.

Accordingly, impact may be absorbed while the rotating member is being elastically supported sequentially by the second regions 131c, the first regions 131b, and the bump foils 121.

At least one top foil 231, 331, 431 (hereinafter referred to as the first top foil(s) 235, 335, 435) among the top foils 231, 331, 431 of the first foil 120 may be formed to be thicker than the other top foils 231, 331, 431 (hereinafter referred to as the second top foils 236, 336, 436).

Specifically, among a total of four top foils 231, 331, 431, two adjacent top foils in the rotational direction of the rotating member may be first top foils 235, 335, 435, and the two first top foils 235, 335, 435 may be formed to be thicker than the other two top foils 231, 331, 431 (or second top foils 236, 336, 436).

As already mentioned above, the first top foils 235, 335, 435 may be formed to be generally thicker than the second top foils 236, 336, 436 or to be thicker only in the second region 131c thereof than the second top foils 136. For example, with reference to FIGS. 3 and 4A-B, two first top foils 235 may be formed to have a uniform thickness t1 in and throughout coupling bodies 131a, first regions 131b, and second regions 131c thereof, and two second top foils 236 may be formed to have a uniform thickness t2 in and throughout coupling bodies 131a, first regions 131b, and second regions 131c thereof. The thickness t1 may be greater than the thickness t2.

Alternatively, referring to FIGS. 5 and 6, two first top foils 335 may be formed to have a varying thickness, particularly, in second regions 131c thereof, that varies from a thickness t4 to a thickness t3, and two second top foils 336 may be formed to have the uniform thickness t4 in and throughout coupling bodies 131a, first regions 131b, and second regions 131c thereof. The thickness t3 may be greater than the thickness t4.

Yet alternatively, with reference to FIGS. 7 and 8A-C, two first top foils 435 may be formed to have a thickness that gradually increases from coupling bodies 131a to second regions 131c thereof. For example, the two first top foils 435 may be formed to have a varying thickness that gradually increases from a thickness t6 to a thickness t5 from coupling bodies 131a to the ends of second regions 131c thereof, and the two second top foils 336 may be formed to have a uniform thickness, i.e., the thickness t6, from coupling bodies 131a to second regions 131c thereof.

As mentioned above, since at least one of the top foils 131, 231, 331, 431 may be formed to be thick in the rotational direction of the rotating member, the rotating member can be properly supported by the top foils 131, 231, 331, 431, even if a high-pressure air layer can be properly supported by the top foils 131, 231, 331, 431 is formed differently from regions to regions. Therefore, the load bearing force for the rotating member can be improved, and at the same time, vibration of the rotating member can be stabilized.

Figure 9A:
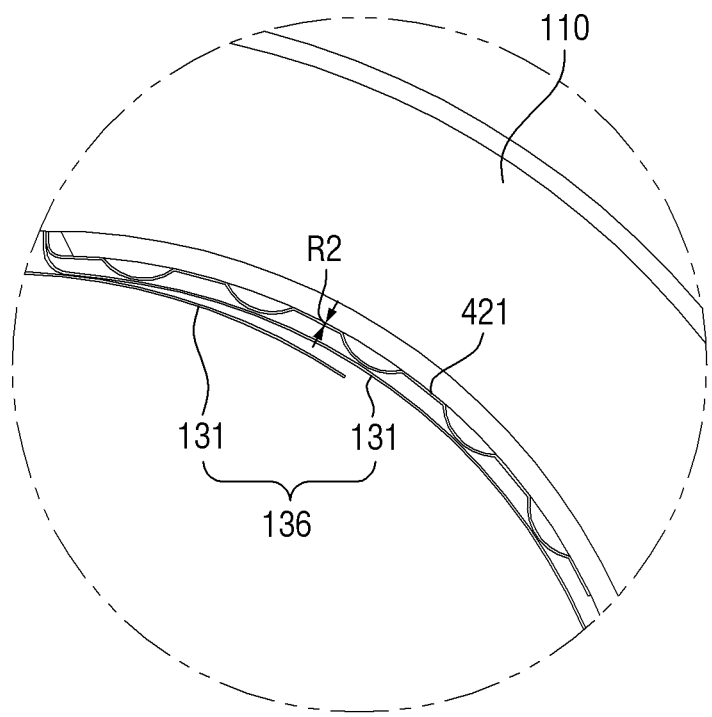
FIG. 9A illustrates a first of an example first foil of the air foil bearing of FIG. 1 that includes bump foils that are relatively thick to correspond to first top foils.
Figure 9B:
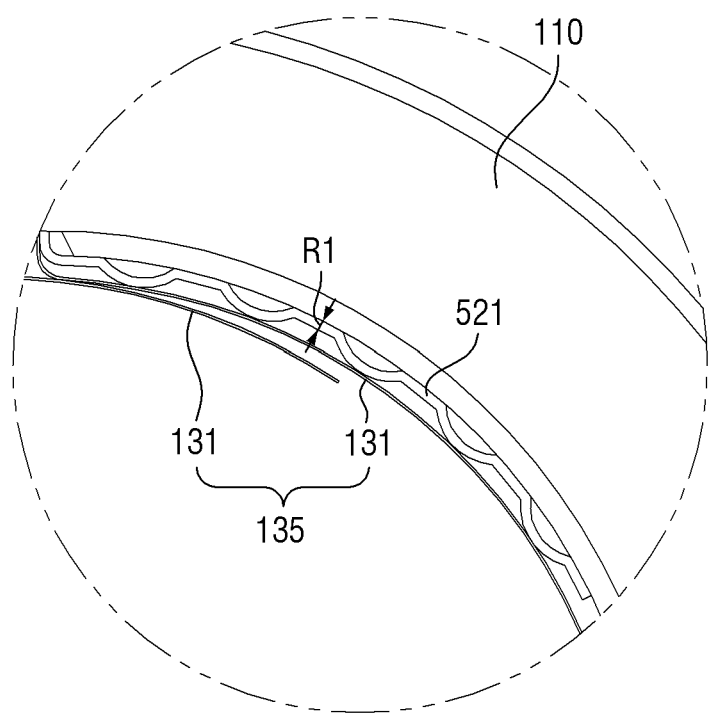
FIG. 9B illustrates a second of the example first foil of FIG. 9A.
Figure 10:
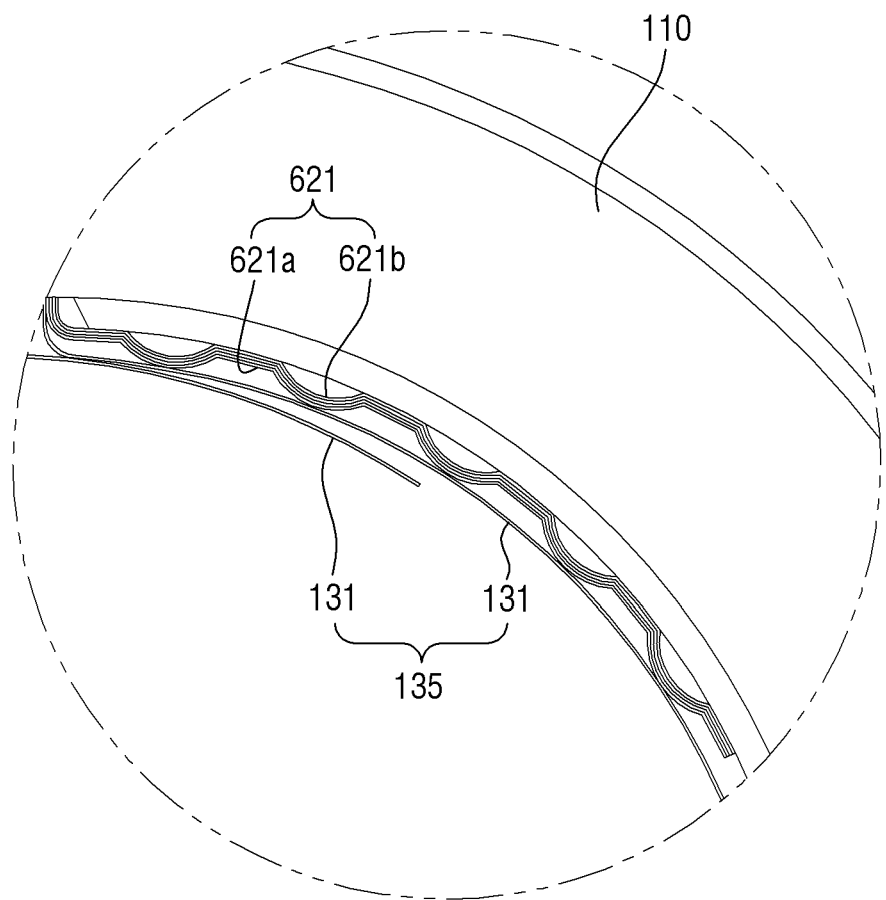
FIG. 10 illustrates another example first foil of the air foil bearing of FIG. 1 that includes bump foils stacked to correspond to first top foils.

As an alternative to first foil 120, FIGS. 9A-B illustrates an example first foil of the air foil bearing 100 that includes bump foils 521, corresponding to first top foils 135, that are thicker than bump foils 421 that are also included in the first foil and that correspond to second top foils 136. FIG. 10 illustrates another example first foil of the air foil bearing 100 that includes bump foils 621 stacked to correspond to first top foils 135.

Referring to FIGS. 9A-B and 10, bump foils of the first foil may all be formed to have the same thickness, or at least one bump foil corresponding to at least one top foil of the second foil that is formed to be thicker than the other top foils may be formed to be thicker than the other bump foils.

Specifically, as illustrated in FIGS. 9A-B, two bump foils 521 corresponding to first top foils 135 that have a large thickness may be formed to be thicker than other two bump foils 421.

For example, two bump foils 521 arranged in a pair to correspond to two first top foils may be formed to have a thickness R1, and other two bump foils 421 arranged in a pair to correspond to second top foils 136 may be formed to have a thickness R2, which is smaller than the thickness R1.

The two bump foils 521 and the other two bump foils 421 may be an alternative to the bump foils 121 provided in the embodiments illustrated in FIGS. 3-8. For example, the two bump foils 521 may correspond to the first top foils 235, 335, or 435, and the other two bump foils 421 may correspond to the first top foils 236, 336, or 436.

In another example, as illustrated in FIG. 10, a pair of bump foils 621 corresponding to first top foils 135 may be arranged to overlap.

Specifically, the bump foils 621 corresponding to the first top foils 135 may include first foils 621a and second foils 621b. The second foils 621b may be provided on the inside of the first foils 621a to overlap with the first foils 621a. Since the second foils 621b overlap with the first foils 621a, on the inside of the first foils 621a, the elastic supporting force of the bump foils 621 can be improved.

The pair of bump foils 621 may be an alternative to the bumps foils 121 that correspond to the first top foils 235, 335, or 435, described with respect to FIGS. 3-8.

As described above, since at least one of the top foils of the second foil is formed to be thicker than the other top foils, the load bearing force of the rotating member can be improved, and impact caused by driving the rotating member can be stably absorbed.

Also, since at least one bump foil of the first foil that corresponds to the at least one top foil is formed to be thicker than the other bump foils or to overlap, the load bearing force of the rotating member can be further improved.

While embodiments are described above, it is not intended that these embodiments describe all possible forms of inventive concepts of the present disclosure. Rather, the words used in the specification are words of description rather than limitation, and it is understood that various changes may be made without departing from the spirit and scope of the inventive concepts of the present disclosure.

Additionally, the features of various implementing embodiments may be combined to form further embodiments of the present disclosure.

What is claimed is:

1. An air foil bearing comprising:
    a bearing housing having a cylindrical shape that forms an accommodation space in a middle thereof for a rotating shaft, rotor, or journal;
    a first foil including a plurality of bump foils, which are arranged along an inner wall surface of the accommodation space of the bearing housing; and
    a second foil including a plurality of top foils, which are arranged in a circumferential direction along an inner circumference of the bearing housing to correspond to the plurality of bump foils and to support the rotating shaft, rotor, or journal,
    wherein a portion of at least one of the plurality of top foils of the second foil is thicker than the other top foils of the plurality of top foils,
    wherein the plurality of top foils are configured as leaf springs and each top foil of the plurality of top foils includes:
        a coupling body, which is coupled to a respective key slot that is provided on the inner circumference of the bearing housing;
        a first region, which is placed on a top surface of at least one of the plurality of bump foils, connected to the coupling body of the top foil; and
        a second region, which is elastically bent from an end of the first region of the top foil and is exposed to be in contact with the rotating shaft, rotor, or journal, the second region of the top foil overlapped by the first region of a respective neighboring top foil of the plurality of top foils,
    wherein the plurality of top foils include at least three top foils and the plurality of bump foils include at least three bump foils,
    wherein at least two top foils of the plurality of top foils are adjacent to each other in a rotational direction of the rotating shaft, rotor, or journal, and each of the at least two top foils include the portion that is thicker than the other top foils of the plurality of top foils, and
    wherein, for each of the at least two top foils, a thickness of the second region thereof is greater than a thickness of the coupling body thereof.

2. The air foil bearing of claim 1, wherein, for each of the at least two top foils, a thickness of the first region and the thickness of the second region thereof is greater than the thickness of the coupling body thereof.

3. The air foil bearing of claim 2, wherein the thickness of the first region and the second region of each of the at least two top foils is greater than a thickness of each of the coupling body, the first region, and the second region of the other top foils.

4. The air foil bearing of claim 1, wherein, for each of the at least two top foils, a thickness of the top foil continuously increases from the coupling body thereof to an end of the second region thereof, furthest away from the coupling body.

5. The air foil bearing of claim 4, wherein the end of the second region of each of the at least two top foils is thicker than each of the coupling body, the first region, and the second region of the other top foils.

6. The air foil bearing of claim 1, wherein, for each of the at least two top foils, the thickness of the second region thereof is greater than a thickness of the first region thereof and the thickness of the coupling body thereof.

7. The air foil bearing of claim 6, wherein the thickness of the second region of each of the at least two top foils is greater than a thickness of each of the coupling body, the first region, and the second region of the other top foils.

8. The air foil bearing of claim 1, wherein, for each of the at least two top foils, a thickness of the top foil continuously increases from an end of the second region thereof to an opposite end of the second region thereof.

9. The air foil bearing of claim 8, wherein, for each of the at least two top foils, the thickness of the coupling body and the first region thereof is the same.

10. The air foil bearing of claim 1, wherein the coupling body, the first region, and the second region of each of the at least two top foils is thicker than each of the coupling body, the first region, and the second region of the other top foils.

11. The air foil bearing of claim 1, wherein at least one bump foil of the plurality of bump foils, corresponding to the at least one of the plurality of top foils of the second foil that is thicker than the other top foils, is thicker than other bump foils of the plurality of bump foils.

12. The air foil bearing of claim 1, wherein the plurality of bump foils include a plurality of overlapping foils.

13. The air foil bearing of claim 1, wherein an entirety of the other top foils of the plurality of top foils has a constant thickness.

14. A set of foils for an air foil bearing that includes a bearing housing having a cylindrical shape that forms an accommodation space in a middle thereof for a rotating shaft, rotor, or journal, and that further includes a first foil including a plurality of bump foils, which are arranged along an inner wall surface of the accommodation space of the bearing housing, the set of foils comprising:
    a plurality of top foils, which are configured to be arranged in a circumferential direction along an inner circumference of the bearing housing to correspond to the plurality of bump foils and to support the rotating shaft, rotor, or journal,
    wherein a portion of at least one of the plurality of top foils of the set of foils is thicker than the other top foils of the plurality of top foils, and each of the at least one of the plurality of top foils has a continuously varying thickness.

15. An air foil bearing comprising:
    the set of foils of claim 14;
    the bearing housing; and
    the first foil.

* * * * *